United States Patent
Fall

(10) Patent No.: US 6,593,878 B2
(45) Date of Patent: Jul. 15, 2003

(54) INTEGRATED NETWORK INTERFACE CARD AND GLOBAL POSITIONING SYSTEM RECEIVER

(75) Inventor: Kevin R. Fall, Berkeley, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/892,218

(22) Filed: Jun. 25, 2001

(65) Prior Publication Data

US 2002/0196181 A1 Dec. 26, 2002

(51) Int. Cl.[7] .............. G01S 5/14; G06F 3/00; G06F 13/36
(52) U.S. Cl. .......... 342/357.1; 710/8; 710/310; 710/313; 455/558; 709/217
(58) Field of Search ............ 342/357.1, 357.06; 455/558; 710/313, 301, 8, 13, 62, 64; 709/217

(56) References Cited

U.S. PATENT DOCUMENTS

| 5,497,339 | A |   | 3/1996  | Bernard |
| 5,519,403 | A |   | 5/1996  | Bickley et al. |
| 5,528,248 | A |   | 6/1996  | Steiner et al. |
| 5,598,849 | A | * | 2/1997  | Browne ............ 600/520 |
| 5,832,247 | A |   | 11/1998 | Gildea et al. |
| 5,861,841 | A |   | 1/1999  | Gildea et al. |
| 5,928,306 | A |   | 7/1999  | France et al. |
| 6,002,982 | A |   | 12/1999 | Fry |
| 6,018,784 | A |   | 1/2000  | Gildea et al. |
| 6,084,542 | A |   | 7/2000  | Wright et al. |
| 6,131,067 | A |   | 10/2000 | Girerd et al. |
| 6,229,478 | B1 | * | 5/2001 | Biacs et al. ............ 342/357.1 |
| 6,380,888 | B1 | * | 4/2002 | Kucik ............ 342/357.03 |
| 6,384,775 | B1 | * | 5/2002 | Chung ............ 342/357.06 |
| 6,389,291 | B1 | * | 5/2002 | Pande et al. ........ 342/357.06 |
| 2002/0029251 | A1 | * | 3/2002 | Ogino et al. ............ 709/217 |

FOREIGN PATENT DOCUMENTS

| EP | 0919787 A1 | * | 6/1999  | ........ G01C/21/20 |
| JP | 09311177 A | * | 12/1997 | ........ G01S/05/14 |

OTHER PUBLICATIONS

A compact dual–band microstrip antenna for portable GPS/cellular phones, M. Sanad et al, IEEE International Symposium on Antennas and Propagation Society, vol. 1, p. 116–119, 1999.*

Multiband planar inverted–F car antenna for mobile phone and GPS, R. Kronberger et al., IEEE International Symposium on Antennas and Propagation Society, vol. 4, p. 2714–2717, 1999.*

* cited by examiner

Primary Examiner—Thomas H. Tarcza
Assistant Examiner—Fred H Mull
(74) Attorney, Agent, or Firm—Blakely, Sokoloff, Taylor & Zafman LLP

(57) ABSTRACT

A combined network interface card and GPS receiver. The combined network interface card and GPS receiver includes a network interface portion for establishing and maintaining a network connection between a host system and a network. The combined network interface card and GPS receiver also includes a GPS portion for determining a location based upon one or more GPS signals.

55 Claims, 7 Drawing Sheets

INTEGRATED NETWORK INTERFACE CARD AND GLOBAL POSITIONING SYSTEM RECEIVER

FIELD OF THE INVENTION

The invention relates generally to navigation and communications and, in particular, to a combination network interface card and Global Positioning System receiver.

BACKGROUND OF THE INVENTION

Computers have become an invaluable, if not indispensable, tool for a broad array of business and industrial applications, as well as for personal use. For many applications, it is desirable—and, in some instances, necessary—to have access to a computer network, such as a Local Area Network (LAN), Wide Area Network (WAN), or the Internet. A computer typically obtains access to a computer network using a network interface card, or NIC. A NIC is an expansion board or peripheral card installed in, or coupled with, a computer that provides a connection to a computer network. The connection may comprise a physical connection (e.g., cable or fiber optic) or a wireless connection. A device driver resident on the host computer controls—in conjunction with an operating system resident on the host—the physical functions of the NIC and coordinates data transfers between the NIC and host computer. Conventional NICs, which are also commonly referred to as network adapters or network interface controllers, typically perform only those functions associated with maintaining the connection between the host computer and the computer network.

Many computer users utilize their computer as a navigational aide to obtain precise geographical or navigational information (e.g., latitude, longitude, elevation) or to run applications requiring such precise navigational data. This navigational data can be obtained using the Global Positioning System (GPS). GPS is a collection of satellites orbiting above the Earth which transmit signals that can be detected using an appropriately configured receiver (i.e., a "GPS receiver"). If the signals from an adequate number of satellites are detected, these GPS signals can be used to determine the location of the GPS receiver. A general purpose computer can be adapted to obtain GPS signals by outfitting the computer with a GPS receiver provided on an expansion board or peripheral card, such GPS expansion boards and peripheral cards being well known in the art.

A computer having a network connection as well as the ability to receive and process GPS signals may be useful in a variety of applications, including surveying, fleet management, tracking and scheduling of commercial vehicles, rail car tracking, hazardous materials tracking, collision avoidance, vehicle-to-roadside services, automobile navigation, as well as marine, aviation, and space navigation. In addition, GPS signals are a source of accurate time data, providing a global-wide, consistent time reference. Also of interest is the ability to receive Differential GPS (DGPS) corrections in real time via a network connection. DGPS systems, such as the Wide Area Augmentation System (WAAS) and the Local Area Augmentation System (LASS), provide error compensation and improve GPS position determinations using one or more GPS receivers fixed at known locations.

Presently, constructing a computer that is both network ready and GPS enabled requires the installation of both a NIC and a GPS receiver. A variety of network interface cards are commercially available, as are expansion boards or peripheral cards providing a GPS receiver and associated processing. However, the introduction of both a NIC and a GPS receiver into a computer chassis consumes scarce volume and slot or card space. The addition of a NIC and a separate GPS receiver can be especially problematic for smaller computers—such as laptop computers, notebook computers, and hand-held computers—and it is these smaller computers that are most desirable for mobile applications requiring navigational data and processing. Further, although a GPS receiver is capable of providing an accurate time source (for use in, e.g., monitoring network traffic), the time information may not be directly available to the NIC, which is a separate component.

DETAILED DESCRIPTION OF THE INVENTION

A conventional computer system can be simultaneously configured for connection to a computer network and for reception of GPS signals using an integrated network interface card and GPS receiver. Such a combined network interface card and GPS receiver (or "NIC/GPS receiver") provides both network access and navigational assistance while occupying minimal volume within the chassis or housing of the host computer system. In addition, an NIC/GPS receiver may provide a highly accurate time source that, for example, may be used for network monitoring purposes. The embodiments of a NIC/GPS receiver described herein may be used with any type of computer system, including desktop computers, servers, work stations, laptop computers, notebook computers, and hand-held computing devices.

Figure 1:
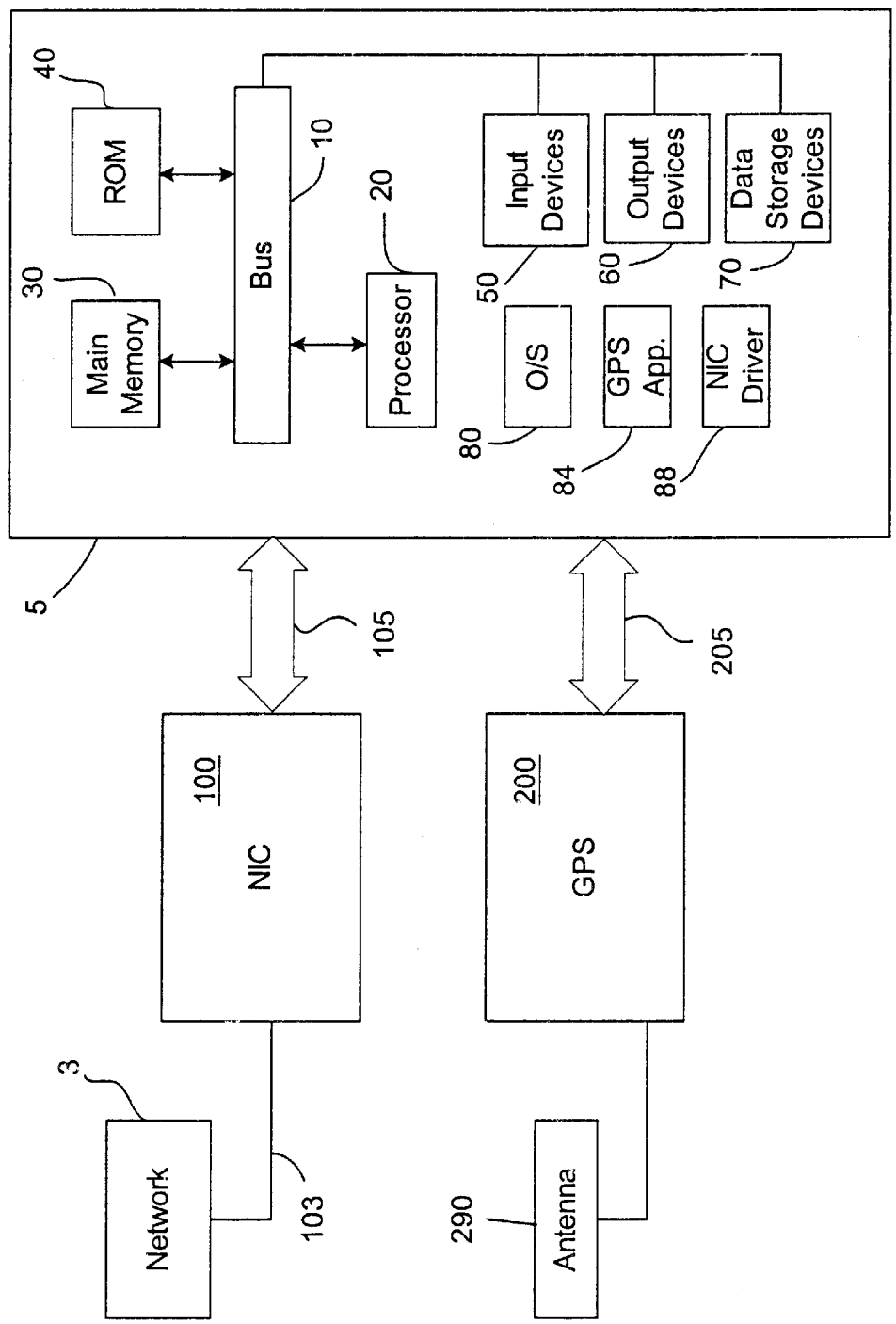
FIG. 1 shows a schematic diagram of an exemplary conventional computer system coupled with a network interface card and a GPS receiver.

Shown schematically in FIG. 1 is an exemplary embodiment of a conventional computer system 5 coupled to a NIC 100 and a GPS receiver 200. The computer system 5 includes a processor 20 coupled to a bus 10. The bus 10 may comprise a Peripheral Component Interconnect (PCI) bus, an Industry Standard Architecture (ISA) bus, a Small Computer System Interface (SCSI) bus, a Universal Serial Bus (USB), or a bus conforming with any other known bus architecture or specification. See, e.g., *PCI Local Bus Specification*, Revision 2.2; *PCI-X Specification*, Revision 1.0a; *SCS1-3; USB Specification* 2.0. Also, the computer system 5 may include two or more buses (e.g., a PCI bus and a USB). Main memory 30, which may comprise one or more random access memory (RAM) devices, is also coupled to the bus 10. The main memory 30 stores information and instructions to be executed by processor 20 and may also store temporary variables or other intermediate information during execution of instructions by processor 20. Computer system 5 also includes read only memory (ROM) 40 coupled via bus 10 to processor 20 for storing static information and instructions for processor 20.

The computer system 5 includes one or more input devices 50, such as a keyboard or mouse, coupled to the processor 20 through bus 10. Also coupled to the processor 20 via bus 10 are one or more output devices 60. Typical output devices 60 include printers and display monitors. The computer system 5 further includes one or more data storage devices 70 coupled to the processor 20 via the bus 10. Common data storage devices include hard disk drives, floppy disk drives, and CD ROM drives. It will be understood by those of ordinary skill in the art that the computer system 5 may include other components and subsystems in addition to those shown and described with respect to FIG. 1. By way of example, the computer system 5 may include video memory, cache memory, as well as other dedicated memory, and additional signal lines and busses.

Resident on computer system 5 is an operating system 80, which may comprise any operating system known in the art. Operating system 80 handles the interface to input devices 50, output devices 60, and data storage devices 70. The operating system 80 also schedules tasks and presents a default interface to a user when no application program is running, as well as performing other functions. The computer system 5 may also have one or more application programs resident thereon and running. For example, a GPS (or DGPS) processing and/or navigation program 84 may be resident on computer system 5, as shown in FIG. 1. Computer system 5 further includes one or more drivers, each driver comprising a program or piece of code providing an interface between a peripheral device and the operating system 80 and/or an application program. One such driver is a NIC driver 88. The NIC driver 88—in conjunction with operating system 80—controls the interface between the computer system 5 and the NIC 100.

Transfer of data and instructions between the NIC 100 and computer system 5 occurs over a communication path 105. Communication path 105 may comprise any suitable connector, socket, or coupling system known in the art. By way of example, the communication path 105 may comprise a PCI compatible connector on NIC 100. The PCI connector, in turn, mates with a corresponding PCI card socket in computer system 5, the PCI card socket coupling the NIC 100 to a PCI bus in computer system 5. The communication path 105 may also be established using a Personal Computer Memory Card International Association (PCMCIA) compatible connector on NIC 100, the NIC 100 being configured as, for example, a PC Card for insertion into a mating 32-bit CardBus slot on computer system 5. See, e.g., *PC Card Standard*, March 1997 Release. Further, the communication path 105 may be established via a USB compatible connector.

The NIC 100 connects computer system 5 to a computer network 3 via a network connection 103. The network connection 103 may be hard wire, such as a fiber optic cable, a coaxial cable, a twisted pair cable, or a telephone line. The network connection 103 may also be wireless. For example, the network connection 103 could be achieved via a cellular phone, a cellular compatible modem, or a Personal Communications Services (PCS) phone and digital modem. See, e.g., Telecommunication Industry Association (TIA) IS-136, Rev. B, *Time Division Multiple Access (TDMA) Cellular PCS*. Wireless over-the-air technologies include Frequency Division Multiple Access (FDMA), Time Division Multiple Access (TDMA), and Code Division Multiple Access (CDMA), the latter being a spread-spectrum technology that is the predominant technology used by PCS networks. See, e.g., TIA IS-102, Project 25 *FDMA Common Air Interface—New Technology Standards Project—Digital Radio Technical Standards*; TIA IS-136, Rev. B, *Time Division Multiple Access (TDMA) Cellular PCS*; American National Standards Institute (ANSI) J-STD-018, *Recommended Minimum Performance Requirements for 1.8 to 2.0 GHz Code Division Multiple Access (CDMA) Personal Stations*; and TIA IS-707-A, *Data Service Options for Wideband Spread Spectrum Systems*.

The network 3 may be based on any one of numerous, well known network technologies. For example, the network 3 may be Ethernet (10 Mb/sec), Fast Ethernet (100 Mb/sec), or Gigabit Ethernet. See Institute of Electrical and Electronics Engineers (IEEE) 802.3, 2000 Ed., *IEEE Standard for Information Technology—Local and Metropolitan Area Networks—Part 3: Carrier Sense Multiple Access with Collision Detection (CSMA/CD) Access Method and Physical Layer Specifications*. Exemplary network technologies also include asynchronous transfer mode (ATM), token ring, and fast token ring, as well as others. See, e.g., Internet Engineering Task Force Request for Comments (IETF RFC) 2226, *IP Broadcast Over ATM Networks*, IETF RFC 2225, *Classical IP and ARP Over ATM*, and IEEE 802.5, 1998 Ed., IEEE *Standard for Information Technology—Telecommunications and Information Exchange Between Systems—Local and Metropolitan Networks—Specific Requirements—Part 5: Token Ring Access Method and Physical Layer Specification*.

Communications between the computer system 5 and the GPS receiver 200 occur over a second communication path 205. The communication path 205 may comprise any suitable connector, socket, or coupling system known in the art. For example, the communication path 205 may be established by a PCI connector on GPS receiver 200 and a corresponding PCI card socket in computer system 5, the PCI card socket coupling the GPS receiver to a PCI bus in computer system 5. The GPS receiver 200 may also be configured as, for example, a PC Card configured for insertion into a mating 32-bit CardBus slot on computer system 5, in which case the communication path 205 is established by PCMCIA compatible connector on GPS receiver 200. Further, the communication path 205 may be established via a USB compatible connector.

Figure 3:
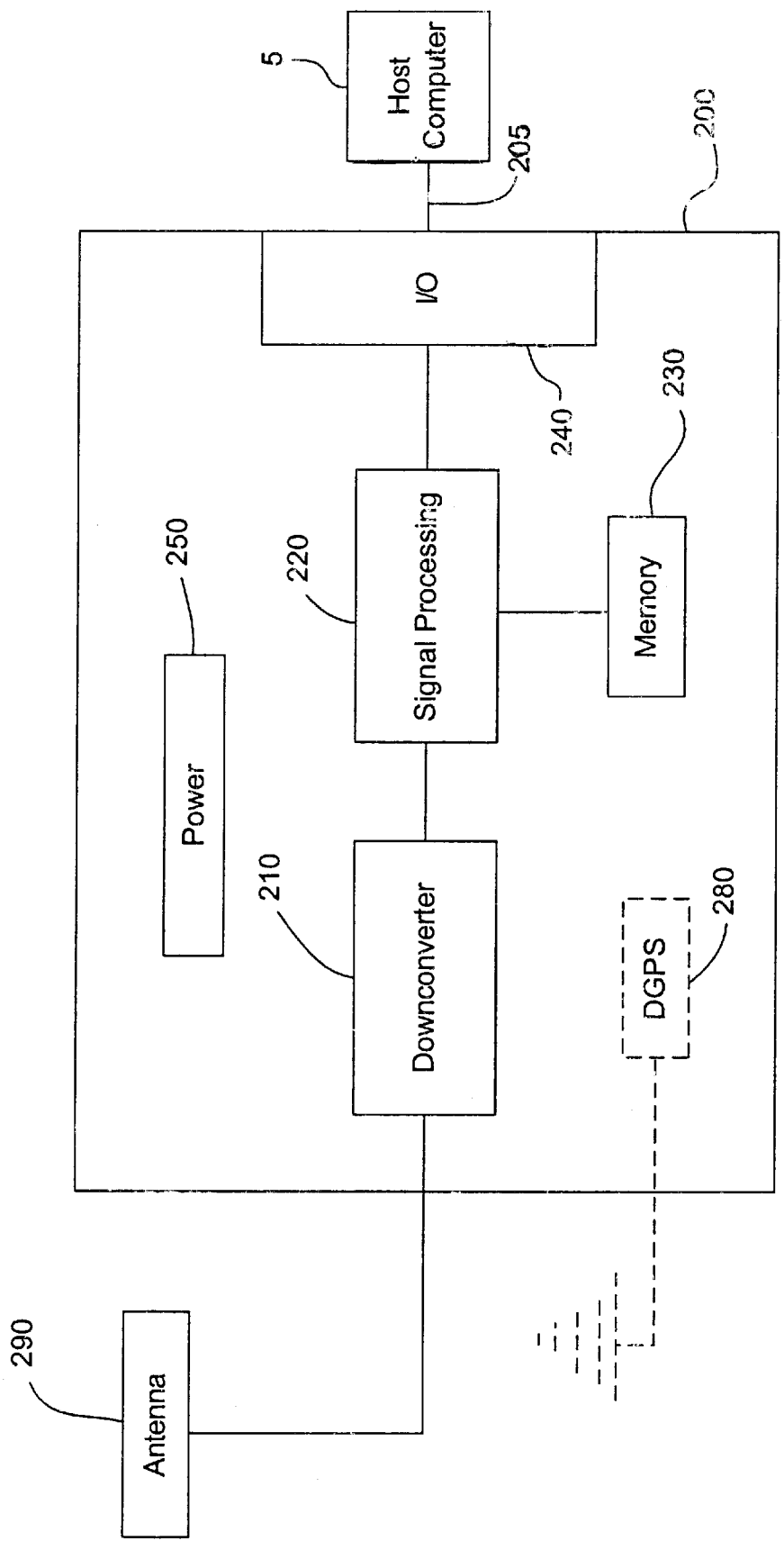
FIG. 3 shows a schematic diagram of the conventional GPS receiver shown in FIG. 1.

The GPS receiver 200 also includes an antenna 290 for receiving a plurality of GPS signals. Antenna 290 may comprise any suitable antenna known in the art. Further, the antenna 290 may be external (as shown in FIGS. 1 and 3) or, alternatively, located on-board the GPS receiver 200.

Figure 2:
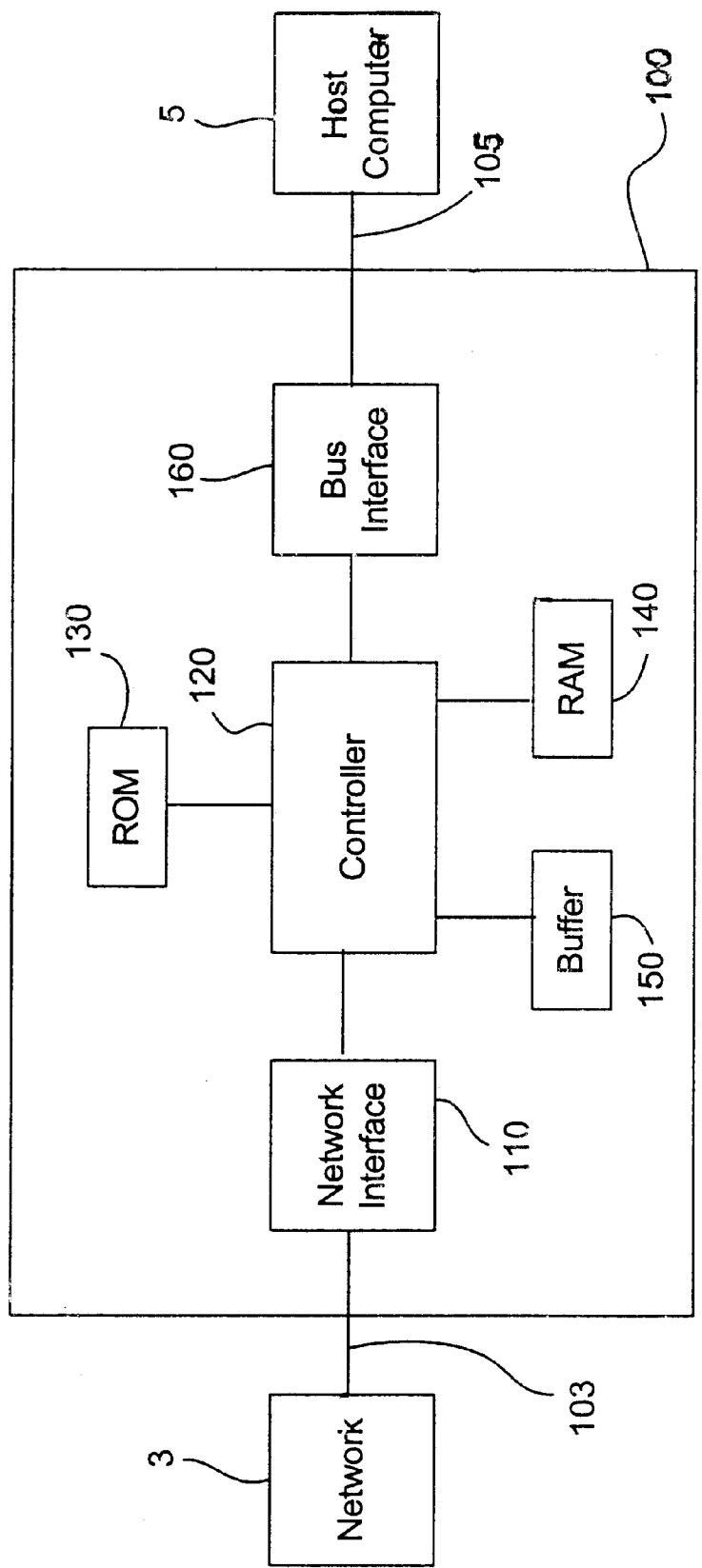
FIG. 2 shows a schematic diagram of the conventional network interface card shown in FIG. 1.

An exemplary embodiment of a conventional NIC 100 is shown in FIG. 2. Referring now to FIG. 2, the NIC 100 includes a network interface 110. Network interface 110 provides, for example, the Ethernet physical layer or an equivalent thereof. The network interface 110 may also include transceiver circuitry for transmitting and receiving data over network connection 103. In addition, the network interface 110 may include logic and/or circuitry for establishing a wireless connection (e.g., CDMA).

Coupled to the network interface is a controller 120. The controller 120 controls operation of the NIC 100. Exemplary functions performed by the controller 120 include data transfers, initialization, diagnostics, error detection, and synchronization with network and/or host bus clocks. The controller 120 also receives commands from the NIC driver 88 resident on the host computer system 5 and generates interrupts to the host computer 5 during, for example, data transfers. The controller 120 may comprise any processor, application-specific integrated circuit (ASIC), or other suitable integrated circuit device known in the art.

The NIC 100 may further include one or more memory devices or circuitry. For example, read only memory (ROM) 130 may be coupled to the controller 120. ROM 130 stores instructions and/or data for operation of the controller 120 (or NIC 100 generally). Further, ROM 130 may contain a unique MAC (Media Access Control) address or link layer address for NIC 100. The NIC 100 may also include random access memory (RAM) 140 coupled to controller 120, the RAM 140 providing temporary storage of control information and network data (e.g., packet or frame data). In addition, a buffer 150 may be coupled to the controller 120. The buffer 150 provides temporary storage for packet or frame data.

A bus interface 160 may also be disposed on NIC 100 and coupled to the controller 120. The bus interface 160 establishes and maintains communication with the system bus 10 (e.g., a PCI bus or a USB) in the host computer system 5. Bus interface 160 may also provide synchronization with the host bus clock.

It should be understood that the NIC 100 shown in FIG. 2 is only exemplary and, further, that the NIC 100 may include many additional components, which have been omitted for clarity. By way of example, the NIC 100 may include cache, clocks, timers, counters, registers, address tables, as well as additional logic circuitry, buffers, and memory circuitry. It should be further understood that a NIC may not include all of the components shown in FIG. 2. Those of ordinary skill in the art will appreciate that many of the components on NIC 100 may be integrated or share common circuitry. For example, the bus interface 160 may be integrated into the controller 120 and, similarly, the network interface 110 (or specific portions thereof) may be integrated into the controller 120.

Referring to FIG. 3, an exemplary embodiment of a conventional GPS receiver 200 is shown. GPS receiver 200 includes a downconverter 210 coupled to antenna 290. The downconverter 210 converts each high frequency GPS signal received by antenna 290 to a selected lower frequency, this downconverted signal then being provided to a signal processing unit 220 coupled with downconverter 210. The signal processing unit 220 receives a plurality of downconverted GPS signals and, based on these signals, determines a location of the GPS receiver 200. The signal processing unit 220 may comprise any processor, ASIC, or other suitable integrated circuit device known in the art. Also, a portion of any necessary signal processing may occur in the host computer system 5.

The signal processing unit 220 may also be adapted for Differential GPS. Generally, there are two forms of Differential GPS: postprocessed DGPS and real-time DGPS. For postprocessed DGPS, the location data determined by signal processing unit 220 and the necessary DGPS correction factors are processed after a user has completed an application. For real-time DGPS, the DGPS correction factors are transmitted to the GPS receiver 200 and these correction factors and the location data derived in signal processing unit 220 are processed in real time to determine corrected position information. A differential ready GPS receiver is generally equipped with a DGPS radio receiver 280 to receive the DGPS correction factors, which are transmitted via a DGPS radio wave signal.

The GPS receiver 200 includes input/output (I/O) circuitry 210 for transferring data and commands between the GPS receiver 200 and the host computer system 5. The I/O circuitry 210 may be compatible with, for example, the PCI specification, the PCMCIA specification, or the USB specification. Also, I/O circuitry 210 may provide synchronization with the system bus 10 of the host computer 5.

Coupled to the signal processing circuitry 220 is memory 230. The memory 230 stores instructions and data needed to process the GPS signals and to determine the location of the GPS receiver 200. The memory may comprise non-volatile memory (e.g., ROM), volatile memory (e.g., RAM), or a combination thereof. In addition to memory 230, or in lieu of memory 230, the GPS receiver 200 may utilize memory on board the host computer system 5.

Typically, the electrical components on GPS receiver 200 receive power from the host computer 5. Optionally, however, the electrical components on GPS receiver 200, or a selected portion of these components, are powered by an on-board power source 250 (e.g., a battery). Alternatively, the electrical components on GPS receiver 200, or a selected portion thereof, may be adapted to receive power from either of the host computer 5 and the on-board power source 250.

It should be understood that the GPS receiver 200 illustrated in FIG. 3 is only exemplary and, further, that the GPS receiver 200 may include additional components, which have been omitted for clarity. By way of example, the GPS receiver 200 may include an amplifier, clock circuitry, as well as additional memory. It should be further understood that a GPS receiver may not include all of the components shown in FIG. 3. Those of ordinary skill in the art will appreciate that many of the components on GPS receiver 200 may be integrated or share common circuitry. For example, the I/O circuitry 240 may be integrated with the signal processing unit 220.

Embodiments of a combined NIC and GPS receiver are shown in FIGS. 4 through 7. It should be noted that, for ease of understanding, these embodiments are described in the context of a NIC. However, those of ordinary skill in the art will understand that the invention is not so limited and, further, that the invention is applicable to any device or technology capable of providing a network connection. Thus, as used herein, the term "NIC" (or "network interface card") refers generally to any device adapted to provide a network connection, including network interface cards and modems, whether digital or analog.

Figure 4:
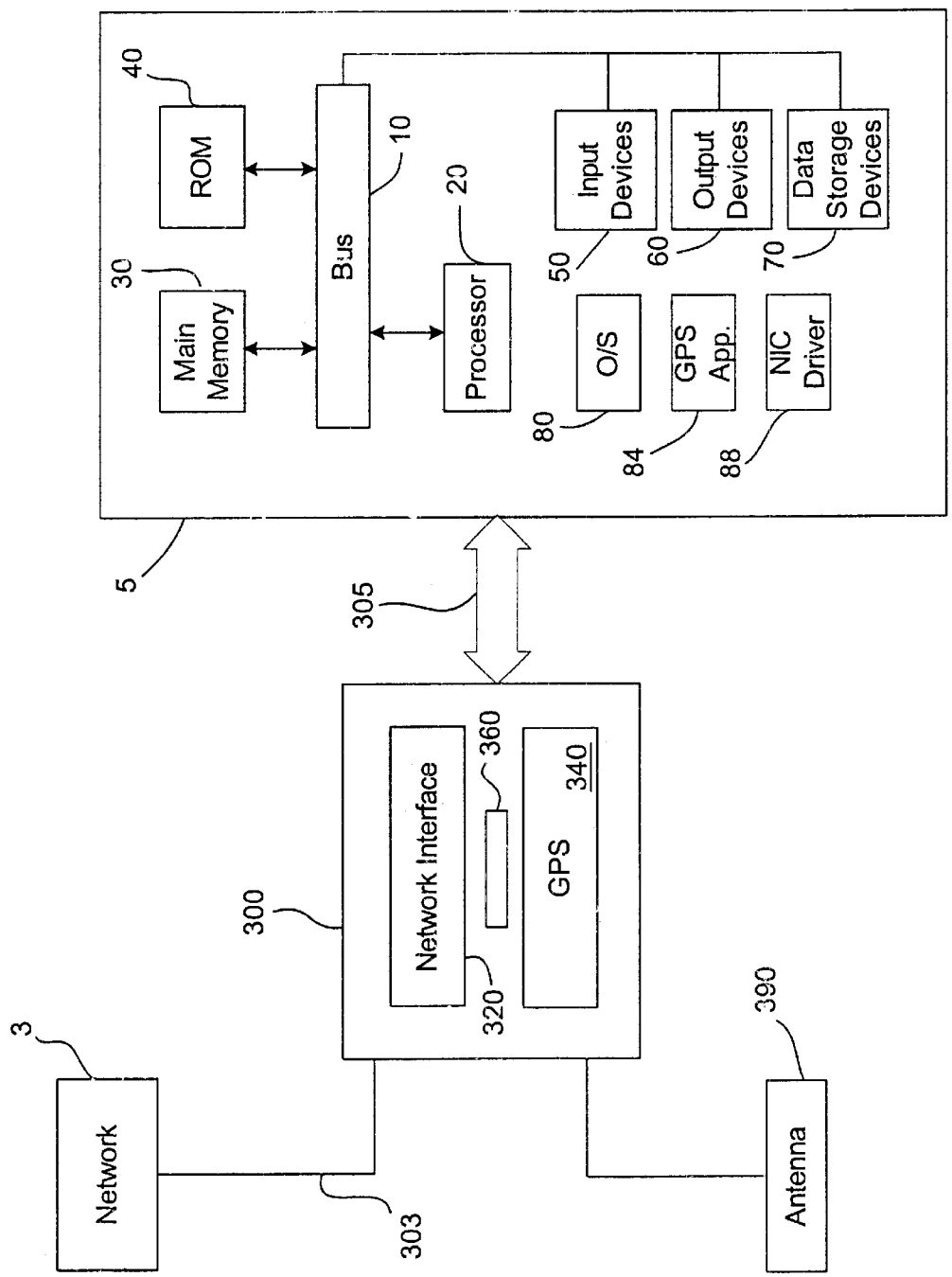
FIG. 4 shows a schematic diagram of an embodiment of an integrated network interface card and GPS receiver coupled to the conventional computer system of FIG. 1.

Referring to FIG. 4, a NIC/GPS receiver 300 is coupled to the computer system 5 via a communication path 305. The NIC/GPS receiver 300 includes a network interface portion 320 and a GPS portion 340. A network connection 303 connects the NIC/GPS receiver 300 to the computer network 3. It should be understood that the exemplary embodiments of the computer system 5 and computer network 3 illustrated in FIG. 4 are essentially the same as those shown and described with respect to FIG. 1. An antenna 390 for receiving GPS signals is also coupled to the NIC/GPS receiver 300.

The communication path 305 may comprise any suitable connector, socket, or coupling system known in the art. By way of example, the communication path 305 may be established by a PCI connector on NIC/GPS receiver 300 and a corresponding PCI card socket in computer system 5, the PCI card socket coupling the NIC/GPS receiver 300 to a PCI bus in computer system 5. The NIC/GPS receiver 300 may also be configured as, for example, a PC Card configured for insertion into a mating 32-bit CardBus slot on computer system 5, in which case the communication path 305 is established by PCMCIA compatible connector on NIC/GPS receiver 300. In a further embodiment, the communication path 305 is established via a USB compatible connector.

The network interface portion 320 comprises the circuitry and/or components necessary to establish and maintain a network connection between computer network 3 and computer system 5. By way of example only, the network interface portion 320 may include circuitry similar to the exemplary NIC 100 shown and described with respect to FIG. 2. However, in other embodiments, as will be described in greater detail below, the network interface portion 320 is integrated with, or shares common circuitry and/or components with, GPS portion 340.

GPS portion 340 comprises the circuitry and/or components necessary to process one or more GPS signals received by antenna 390 and, further, to determine a location of the NIC/GPS receiver 300 (and, hence, of host computer 5). For example, the GPS portion 340 may include circuitry similar to the exemplary GPS receiver 200 shown and described with respect to FIG. 3. In other embodiments, as noted above, the GPS portion 340 and the network interface portion 320 are integrated or share common circuitry and/or components.

The antenna 390 may comprise any suitable antenna known in the art. For example, the antenna 390 may comprise an external antenna that is connected to the NIC/GPS receiver 300 via any suitable connector or connection method. In another embodiment, the antenna 390 may comprise an on-board antenna that is disposed on the NIC/GPS receiver 300 itself. Also, the antenna 390 may be a shared antenna. For example, the antenna 390 may be configured to receive GPS signals and to provide a wireless network connection 303. Alternatively, the antenna 390 is configured to receive GPS signals and to receive DGPS correction information—e.g., to receive correction data from a WAAS satellite or from a LAAS high frequency radio transmitter. Further, in addition to receiving GPS signals, the antenna 390 may be configured to provide a wireless network connection 303 and to receive DGPS correction data.

To use NIC/GPS receiver 300, the NIC/GPS receiver 300 is coupled to host computer system 5 via communication path 305. The communication path 305 may be established using PCI compatible connectors, PCMCIA compatible connectors, USB compatible connectors, or using any other suitable connector, connection method, or standard known in the art. Data and/or commands may be exchanged between the NIC/GPS receiver 300 via the communication path 305. In addition, the NIC/GPS receiver 300 may utilize the memory of, utilize the processing capability of, and/or draw power from the host computer system 5 over the communication path 305.

An external antenna 390 is coupled to the NIC/GPS receiver 300. The antenna 390 may be permanently connected to the NIC/GPS receiver 300 or, alternatively, coupled to the NIC/GPS receiver 300 using any suitable connector or connection method. In another embodiment, the antenna 390 is disposed on board the NIC/GPS receiver 300. The antenna 390 is adapted to receive a plurality of GPS signals and to provide those signals to the NIC/GPS receiver 300 for processing. In a further embodiment, antenna 390 is also configured to receive DGPS correction information, such as may be received from a WAAS satellite or a LAAS high frequency transmitter. In yet a further embodiment, the antenna 390 is used to establish a wireless network connection 303 (e.g., cellular, PCS). In another embodiment, the antenna 390 may receive GPS signals, receive DGPS signals, and establish a network connection 303. It should be understood that the NIC/GPS receiver 300 may include a separate, dedicated antenna (not shown) for receiving DGPS correction data.

A network connection 303 may then be established between the host computer 5 and the computer network 3, which may comprise a LAN, a WAN, the Internet, or other computer network. The network connection 303 may be hard wire or wireless. If necessary, a hard wire (e.g., coaxial cable, twisted pair cable, telephone line, fiber optic cable) connection is made to the NIC/GPS receiver 300 using any suitable connector (e.g., an XJACK® connector) on NIC/GPS receiver 300. For a wireless connection, any suitable over-the-air communication standard may be implemented by NIC/GPS receiver 300, such as, for example, FDMA, TDMA, or CDMA. As noted above, the computer network 3 may be based upon—and, hence, the network connection 303 compatible with—any suitable network technology known in the art (e.g., Ethernet, Fast Ethernet, Gigabit Ethernet, token ring, fast token ring, ATM).

In operation, the NIC/GPS receiver 300 will receive one or more GPS signals from antenna 390 and perform the necessary signal processing to determine a location of the NIC/GPS receiver 300. The NIC/GPS receiver 300 will also maintain the connection with computer network 3 and will manage data transfers between the computer network 3 and the host computer 5. Reception and processing of GPS signals may occur simultaneously with data transfers between computer network 3 and host computer 5. For example, it may be desirable to download DGPS correction factors, mapping data, fleet management data (e.g., vehicle identification, cargo identification, vehicle operator), hazardous payload information, as well as other information over the network connection 303 while receiving and processing GPS signals.

In one embodiment, the NIC/GPS receiver 300 includes instructions and/or circuitry configured to determine corrected geographical data using DGPS correction factors. The DGPS correction factors may be downloaded—in either real time or after GPS processing—from a server or Internet site via the network connection 303, received by antenna 390, or received using a dedicated DGPS antenna, as noted above. Thus, the NIC/GPS receiver 300 may provide such corrected navigational data to the host computer 5 and no post processing need be done by the host computer 5. The corrected navigational data may be determined in real time or determined using postprocessing.

In another embodiment, the NIC/GPS receiver 300 provides an accurate time source and may include a "time server." As used herein, the term "time server" refers to any device or system that is capable of providing an indication of time. In order to obtain an accurate geographical reference point (i.e., one's position) based upon a plurality of GPS signals, it is necessary to have an accurate time reference. To meet this need, each GPS satellite is adapted to provide a highly accurate and precise time basis, this time basis being transmitted with the GPS signal originating from a GPS satellite. Thus, one or more GPS signals received at NIC/GPS receiver 300 can provide a very accurate time reference.

The NIC/GPS receiver 300 can, therefore, provide an accurate notion of time to other hardware or applications within the NIC/GPS receiver 300 itself or to the host computer 5. For example, the NIC/GPS receiver 300 may use the GPS signals to set—and to continually update—an internal clock or timer server 360 (see FIG. 4). Also, the time source provided by the GPS signals (or the time server 360) can be used to time stamp data packets flowing through the NIC/GPS receiver 300 between the computer network 3 and host computer 5. Such highly accurate time stamps may be used for a number of purposes, including network analysis and diagnostics, determination of high traffic periods, network utilization studies, and security. Any one or more of these functions may be performed on board the NIC/GPS receiver 300 or, optionally, on the host computer 5.

As noted above, a NIC/GPS receiver may include many of the components included in the conventional NIC 100 shown in FIG. 2 and in the conventional GPS receiver 200 shown in FIG. 3. However, advantages of the NIC/GPS receiver disclosed herein include the potential for component integration, simplicity, and volume reduction. These advantages, as well as others, will be apparent by reference to the embodiments disclosed in FIGS. 5 through 7.

Figure 5:
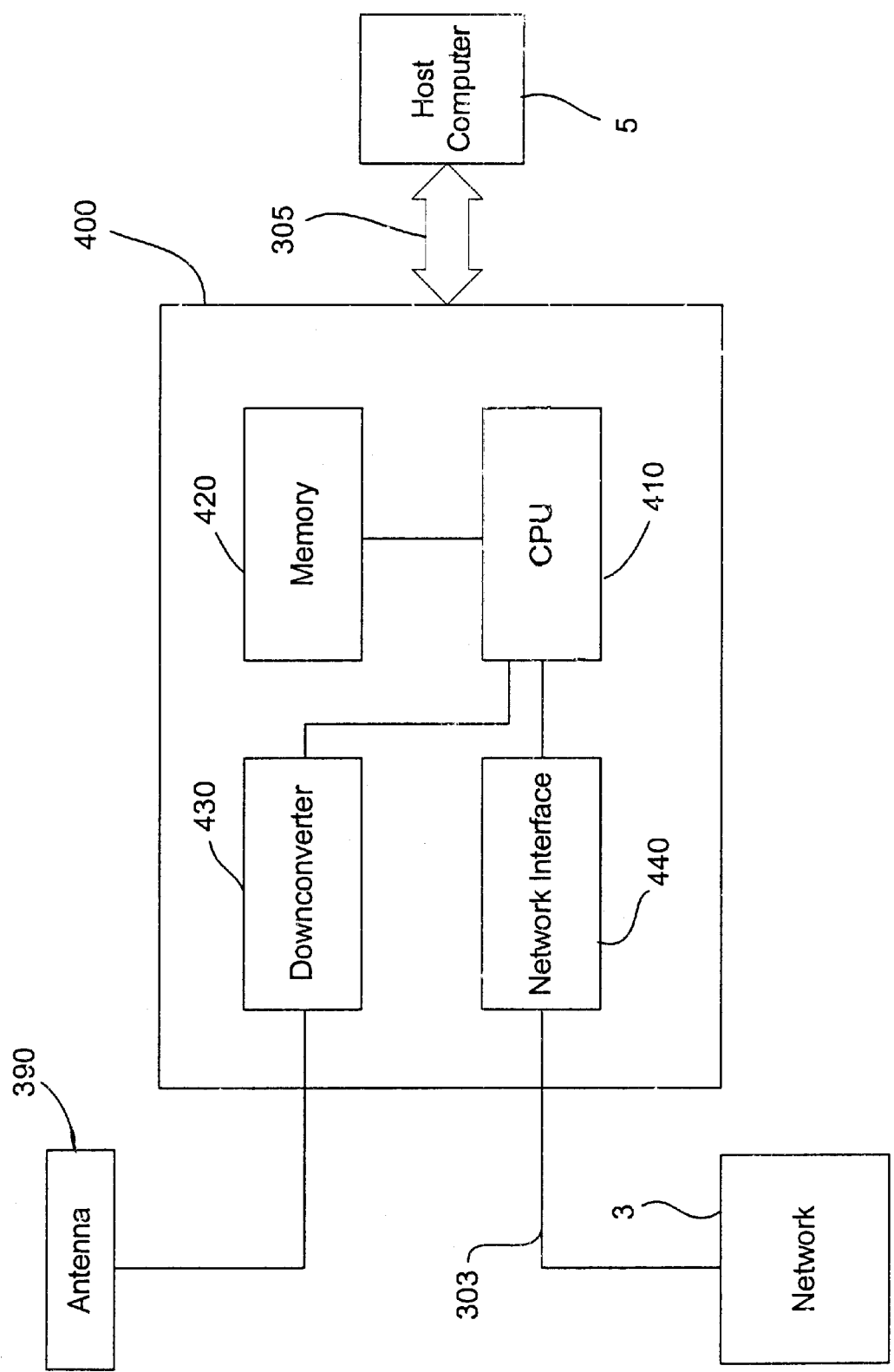
FIG. 5 shows a schematic diagram of another embodiment of an integrated network interface card and GPS receiver.

Referring to FIG. 5, a NIC/GPS receiver 400 includes a central processing unit (CPU) 410 and a memory 420 coupled thereto. A downconverter 430 is coupled to the CPU 410, and the downconverter 430 is connected to the antenna 390 (shown in FIG. 4 as an external antenna). Also coupled with the CPU 410 is a network interface 440, the network interface 440 being coupled via the network connection 303 to the computer network 3. The communication path 305 couples the NIC/GPS receiver 400 with the host computer 5.

The antenna 390 receives one or more GPS signals and provides the GPS signals to the downconverter 430. The downconverter 430 converts each high frequency GPS signal to a selected lower frequency, this downconverted signal then being provided to CPU 410. The CPU 410 receives a plurality of downconverted GPS signals and, based on these signals, determines a location of the NIC/GPS receiver 400. In an alternative embodiment, the CPU 410 determines corrected geographical data based upon DGPS correction factors (which may be received according to any of the embodiments described above).

The CPU 410 also maintains the network interface between computer network 3 and host computer 5. Exemplary functions performed by the CPU 410 include data transfers, initialization, diagnostics, error detection, and synchronization with network and/or host bus clocks. The CPU 410 may also receive commands from, for example, the NIC driver 88 resident on the host computer system 5 and generate interrupts to the host computer 5 during, for example, data transfers. In addition, CPU 410 provides a bus interface and manages data transfers between the NIC/GPS receiver 400 and the host computer 5. The CPU 410 establishes and maintains communication with the system bus 10 (e.g., a PCI bus or USB) in the host computer system 5 and may also provide synchronization with the host bus clock. The CPU 410 may comprise any processor, ASIC, or other suitable integrated circuit device known in the art.

The network interface 440 provides, for example, the Ethernet physical layer or an equivalent thereof. The network interface 440 may also include transceiver circuitry for transmitting and receiving data over network connection 303. In addition, the network interface 440 may include logic and/or circuitry for establishing a wireless connection (e.g., CDMA).

Memory 420 may comprise any one or suitable combination of non-volatile memory (e.g., ROM), volatile memory (e.g., RAM), and/or buffer memory. The memory 420 stores instructions and data needed to process the GPS signals (as well as the DGPS correction factors) and to determine the location of the NIC/GPS receiver 400. Memory 420 may also store instructions and data necessary to establish and maintain the network interface. The memory 420 may further contain a unique MAC address or link layer address for the NIC/GPS receiver 400. Further, memory 420 may provide temporary storage for control information and packet or frame data. In addition to memory 420, or in lieu of memory 420, the NIC/GPS receiver 400 may utilize memory on board host computer 5.

In other embodiments, the NIC/GPS receiver 400 may include other components and/or circuitry in addition to—or in lieu of—that shown in FIG. 4. For example, the NIC/GPS receiver 400 may include a bus interface unit or an I/O unit. Further, the NIC/GPS receiver 400 may include cache, clock circuitry, timers, counters, registers, address tables, as well as additional logic circuitry, buffers, and memory circuitry. Also, the NIC/GPS receiver 400 may not include all of the components shown in FIG. 4. By way of example, either of the network interface 440 or the downconverter 430 (or specific portions thereof, respectively) may be integrated into the CPU 410.

Figure 6:
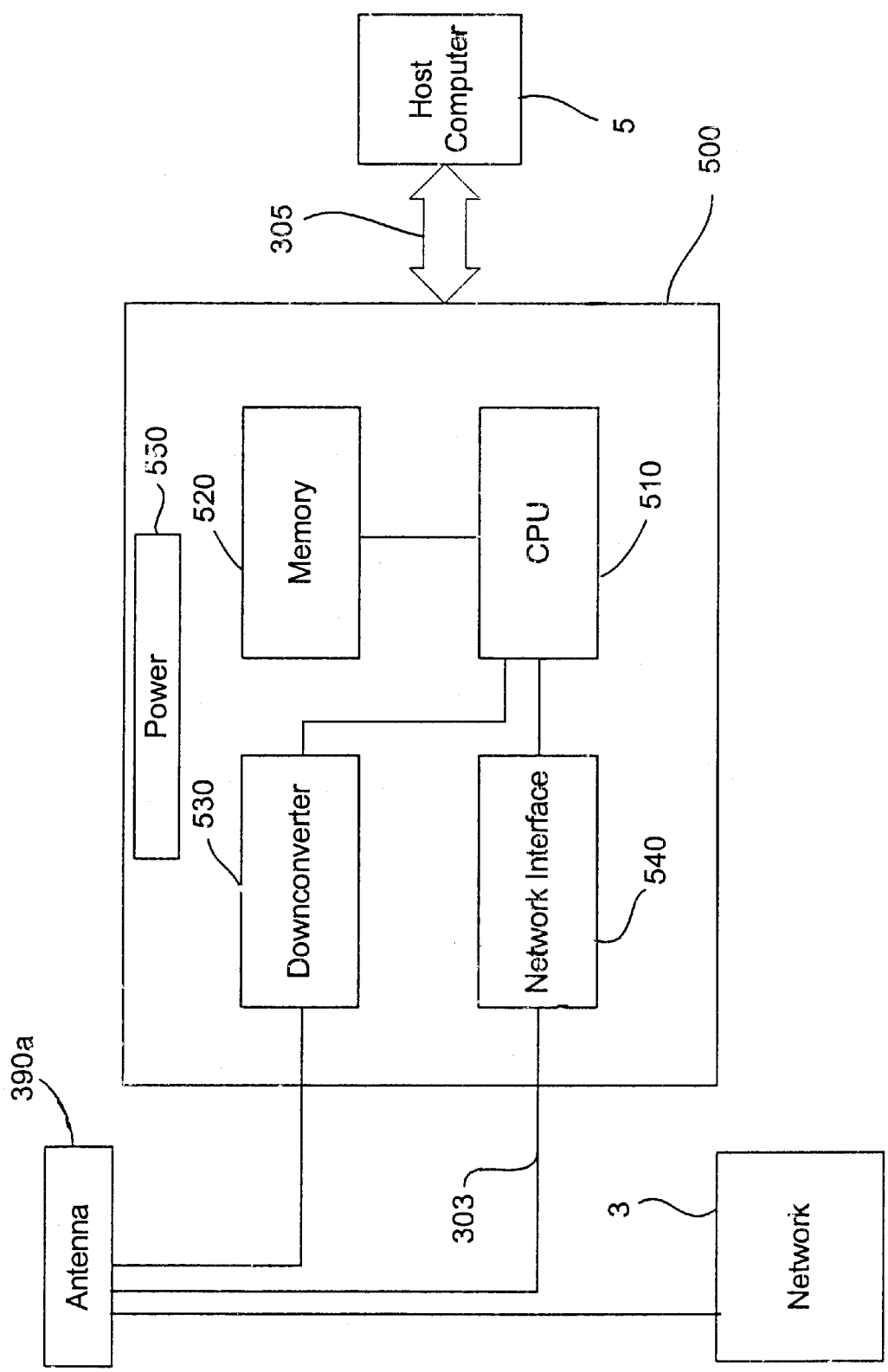
FIG. 6 shows a schematic diagram of a further embodiment of an integrated network interface card and GPS receiver.

A further embodiment of a NIC/GPS receiver 500 is illustrated in FIG. 6. The NIC/GPS receiver 500 is essentially the same as that shown and described with respect to FIG. 5; however, the NIC/GPS receiver 500 is coupled to an antenna 390*a* configured to receive GPS signals and to provide a wireless network connection 303 to computer network 3. The network interface 540 includes instructions and/or circuitry to implement an over-the-air communications interface, such as CDMA.

In a further embodiment, also illustrated in FIG. 6, the NIC/GPS receiver 500 includes an on-board power source 550 (e.g., a battery). The on-board power source 550 may be used to power any one or more of the components or circuitry on NIC/GPS receiver 500. The power source 550 may be useful where the NIC/GPS receiver 500 includes or is functioning as a time server, such that the reference time will not be lost if there is a power disruption between the NIC/GPS receiver 500 and host computer 5.

Figure 7:
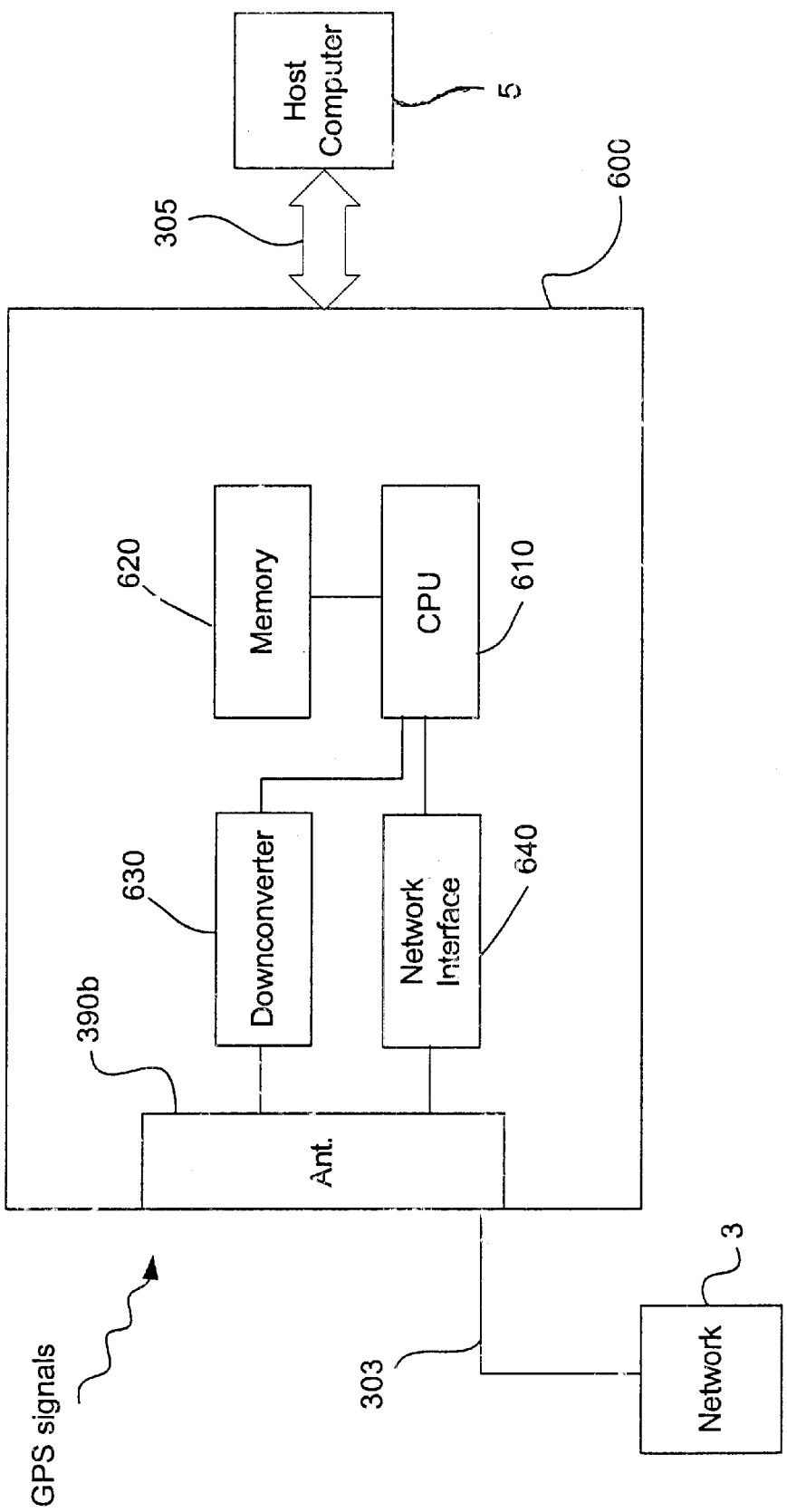
FIG. 7 shows a schematic diagram of yet another embodiment of an integrated network interface card and GPS receiver.

Yet another embodiment of a NIC/GPS receiver 600 is shown in FIG. 7. The NIC/GPS receiver 600 is essentially the same as that shown and described with respect to FIG. 5; however, the NIC/GPS receiver 600 includes an on-board antenna 390*b*. The on-board antenna 390*b* is configured to receive GPS signals. Optionally, the on-board antenna 390*b* is further adapted to provide a wireless network connection 303 to computer network 3 (as shown in FIG. 7) and/or to receive DGPS correction data.

A NIC/GPS receiver 300, 400, 500, 600 may be constructed according to any well known and generally accepted form factor or specification. For example, a NIC/GPS receiver may be manufactured to conform to a PCI form factor—i.e., a PCI card. Such a PCI card generally comprises a circuit board having a PCI connector secured thereto and any electrical components or circuitry formed or attached to the circuit board. In another embodiment, a NIC/GPS receiver is constructed as a PC Card compatible with the PCMCIA specification. This PC Card includes a housing of a prescribed form factor encasing the electronic components and circuitry. In a further embodiment, the NIC/GPS receiver includes a USB compatible interface.

Embodiments of a NIC/GPS receiver 300, 400, 500, 600 having been herein described, those of ordinary skill in the art will appreciate the many advantages thereof. A NIC/GPS receiver provides both a network connection and GPS functionality in a single peripheral component, thereby minimizing volume and requiring less card space within a computer chassis. Volume minimization is achieved, at least in part, through component integration and/or shared circuitry. Processing of both GPS signals and DGPS correction data on a single peripheral device is realized using a NIC/GPS receiver, and this processing capability may be utilized in real time if desired. Corrected GPS data can be provided to a host computer and no post processing is required on the host to determined corrected geographical data. Additionally, the NIC/GPS receiver may provide an accurate indication of time and, accordingly, network traffic flowing through the NIC/GPS receiver may be time stamped with no intervention from the host computer. Further, such a NIC/GPS receiver may be utilized in any type of computer system and may be used with any now known or later developed network technology, wireless technology, or computer interface technology (e.g., PCI, PCMCIA, USB).

The foregoing detailed description and accompanying drawings are only illustrative and not restrictive. They have been provided primarily for a clear and comprehensive understanding of the present invention and no unnecessary limitations are to be understood therefrom. Numerous additions, deletions, and modifications to the embodiments described herein, as well as alternative arrangements, may be devised by those skilled in the art without departing from the spirit of the present invention and the scope of the appended claims.

What is claimed is:

1. A peripheral card comprising:
    a network interface portion to maintain a network connection between a network and a host system;
    a GPS receiver portion to determine a location of the peripheral card in response to a GPS signal; and
    a processing device, the processing device to perform processing for the GPS receiver portion and manage data transfers for the network interface portion.

2. The peripheral card of claim 1, further comprising an antenna coupled to the peripheral card to receive the GPS signal.

3. The peripheral card of claim 2, the antenna comprising one of an external antenna and an on-board antenna.

4. The peripheral card of claim 1, the GPS receiver portion to further provide an indication of time in response to the GPS signal.

5. The peripheral card of claim 1, further comprising a power source.

6. The peripheral card of claim 1, further comprising a communication path to couple the peripheral card to the host system.

7. The peripheral card of claim 6, the communication path comprising one of a PCI compatible connection, a PCMCIA compatible connection, and a USB compatible connection.

8. The peripheral card of claim 1, the network connection comprising a wireless connection.

9. The peripheral card of claim 1, the network connection including one of a coaxial cable, a twisted pair cable, a telephone line, and a fiber optic cable.

10. A peripheral card comprising:
    a network interface portion to maintain a network connection between a network and a host system; and
    a GPS receiver portion to determine an indication of time in response to a GPS signal provide the time indication to the network interface portion;
    wherein the network interface portion can determine a time stamp for a received packet based upon the time indication.

11. The peripheral card of claim 10, further comprising an antenna coupled to the peripheral card to receive the GPS signal.

12. The peripheral card of claim 11, the antenna comprising one of an external antenna and an on-board antenna.

13. The peripheral card of claim 10, further comprising a time server coupled with the GPS receiver portion, the time server receiving a time indication from the GPS receiver portion.

14. The peripheral card of claim 10, further comprising a power source.

15. The peripheral card of claim 10, further comprising a communication path to couple the peripheral card to the host system.

16. The peripheral card of claim 15, the communication path comprising one of a PCI compatible connection, a PCMCIA compatible connection, and a USB compatible connection.

17. The peripheral card of claim 10, the network connection comprising a wireless connection.

18. The peripheral card of claim 10, the network connection including one of a coaxial cable, a twisted pair cable, a telephone line, and a fiber optic cable.

19. A peripheral card comprising:
    a downconverter to receive a GPS signal and to provide a second signal in response to the GPS signal;
    a network interface to connect the peripheral card to a network; and
    a central processing unit coupled to the downconverter and to the network interface, the central processing unit to
    determine a location of the peripheral card in response to the second signal, and
    manage data transfers for the network interface.

20. The peripheral card of claim 19, further comprising an antenna coupled to the downconverter.

21. The peripheral card of claim 19, further comprising an antenna coupled to the downconverter and to the network interface.

22. The peripheral card of claim 19, further comprising an antenna to receive GPS signals and DGPS correction data.

23. The peripheral card of claim 22, the antenna to provide a wireless connection between the peripheral card and the network.

24. The peripheral card of claim 19, further comprising an on-board antenna.

25. The peripheral card of claim 19, further comprising a memory coupled to the central processing unit.

26. The peripheral card of claim 19, further comprising a power source.

27. The peripheral card of claim 19, further comprising a communication path to couple the peripheral card to a host system.

28. The peripheral card of claim 27, the communication path comprising one of a PCI compatible connection, a PCMCIA compatible connection, and a USB compatible connection.

29. The peripheral card of claim 19, further comprising a network connection to couple the network interface to the network.

30. The peripheral card of claim 29, the network connection comprising a wireless connection.

31. The peripheral card of claim 29, the network connection including one of a coaxial cable, a twisted pair cable, a telephone line, and a fiber optic cable.

32. An apparatus comprising:
a computer system;
a peripheral card coupled to the computer system, the peripheral card including
a network interface portion to maintain a network connection between a network and the computer system;
a GPS receiver portion to determine a location of the peripheral card in response to a GPS signal; and
a processing device, the processing device to perform processing for the GPS receiver portion and manage data transfers for the network interface portion.

33. The apparatus of claim 32, further comprising an antenna coupled to the peripheral card to receive the GPS signal.

34. The apparatus of claim 33, the antenna comprising one of an external antenna and an on-board antenna.

35. The apparatus of claim 32, the peripheral card comprising one of a PCI compatible peripheral card, a PCMCIA compatible peripheral card, and a USB compatible peripheral card.

36. An apparatus comprising:
a computer system;
a peripheral card coupled to the computer system, the peripheral card including
a network interface portion to maintain a network connection between a network and the computer system; and
a GPS receiver portion to determine an indication of time in response to a GPS signal and provide the time indication to the network interface portion;
wherein the network interface portion can determine a timestamp for a packet based upon the time indication.

37. The apparatus of claim 36, further comprising an antenna coupled to the peripheral card to receive the GPS signal.

38. The apparatus of claim 37, the antenna comprising one of an external antenna and an on-board antenna.

39. The apparatus of claim 36, the peripheral card comprising one of a PCI compatible peripheral card, a PCMCIA compatible peripheral card, and a USB compatible peripheral card.

40. The apparatus of claim 36, further comprising a time server coupled with the GPS receiver portion, the time server receiving a time indication from the GPS receiver portion.

41. A method comprising:
receiving a GPS signal at a device, the device coupled to a host system;
determining an indication of time in response to the GPS signal;
providing the indication of time to a network interface, the network interface determining a timestamp for a received packet based upon the indication of time; and
establishing a network connection between the device and a network.

42. The method of claim 41, further comprising providing the indication of time to the host system.

43. The method of claim 41, further comprising providing the indication of time to a time server.

44. The method of claim 41, wherein establishing a network connection comprises establishing a wireless connection between the device and the network.

45. A peripheral card comprising:
means for maintaining a network connection between a network and a host system;
means for determining a location of the peripheral card in response to a GPS signal; and
means for processing data, the means for processing data to perform processing for the means for determining a location and manage data transfer for the means for maintaining a network connection.

46. The peripheral card of claim 45, further comprising means for receiving the GPS signal.

47. The peripheral card of claim 45, further comprising means for receiving DGPS correction data.

48. The peripheral card of claim 45, further comprising means for establishing a wireless connection between the peripheral card and the network.

49. A peripheral card comprising:
means for maintaining a network connection between a network and a host system; and
means for determining an indication of time in response to a GPS signal, the means for determining to provide the time indication to the means for maintaining a network connection;
wherein the means for maintaining a network connection can determine a timestamp for a received packet based upon the time indication.

50. The peripheral card of claim 49, further comprising means for receiving the GPS signal.

51. The peripheral card of claim 49, further comprising means for determining a location of the peripheral card in response to the GPS signal.

52. An article of manufacture comprising:
a machine accessible medium, the machine accessible medium providing instructions that, when executed by a machine, cause the machine to
receive a GPS signal at a device, the device coupled to a host system;
determine an indication of time in response to the GPS signal;
provide the indication of time to a network interface, the network interface to determine a timestamp for a received packet based upon the indication of time; and
establish a network connection between the device and a network.

53. The article of manufacture of claim 52, wherein the instructions, when executed, further cause the machine to provide the indication of time to the host system.

54. The article of manufacture of claim 52, wherein the instructions, when executed, further cause the machine to provide the indication of time to a time server.

55. The article of manufacture of claim 52, wherein the instructions, when executed, further cause the machine, when establishing a network connection, to establish a wireless network connection between the device and the network.

* * * * *